(12) United States Patent
Mizoue (10) Patent No.: US 9,887,601 B2
(45) Date of Patent: Feb. 6, 2018

(54) STATOR OF ROTARY ELECTRIC MACHINE

(71) Applicant: HONDA MOTOR CO., LTD, Minato-ku, Tokyo (JP)

(72) Inventor: Kiyonobu Mizoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 325 days.

(21) Appl. No.: 14/845,512

(22) Filed: Sep. 4, 2015

(65) Prior Publication Data

US 2016/0072351 A1 Mar. 10, 2016

(30) Foreign Application Priority Data

Sep. 8, 2014 (JP) .................................. 2014-182339

(51) Int. Cl.
*H02K 3/52* (2006.01)

(52) U.S. Cl.
CPC ......... *H02K 3/522* (2013.01); *H02K 2203/06* (2013.01); *H02K 2203/12* (2013.01)

(58) Field of Classification Search
CPC ...................................................... H02K 3/522
See application file for complete search history.

(56) References Cited

U.S. PATENT DOCUMENTS

| 8,497,618 B2* | 7/2013 | Kato ........................ H02K 3/28 310/194 |
| 8,847,457 B2* | 9/2014 | Yoshida .................. H02K 3/522 29/596 |
| 2012/0267979 A1* | 10/2012 | Yoshida .................. H02K 3/522 310/214 |
| 2016/0072351 A1* | 3/2016 | Mizoue .................. H02K 3/522 310/71 |

FOREIGN PATENT DOCUMENTS

JP 2012-228152 11/2012

* cited by examiner

*Primary Examiner* — Robert W Horn
(74) *Attorney, Agent, or Firm* — Amin, Turocy & Watson LLP (57) ABSTRACT

First convexities and second convexities are formed in opposing first wall surfaces and second wall surfaces of lead wire end portion holding grooves, and in holding coil ends that are housed in the lead wire end portion holding grooves with the first convexities and the second convexities, the first convexities and the second convexities are formed at positions that are offset with respect to each other in a circumferential direction and one end portions of the coil ends of the same phase that are connection portions are drawn out towards an outer diameter side from between the first convexities and the second convexities.

17 Claims, 11 Drawing Sheets

STATOR OF ROTARY ELECTRIC MACHINE

CROSS REFERENCE TO RELATED APPLICATIONS

The present application claims priority under 35 U.S.C. § 119 to Japanese Patent Application No. 2014-182339, filed Sep. 8, 2014, entitled "Stator of Rotary Electric Machine." The contents of this application are incorporated herein by reference in their entirety.

BACKGROUND

1. Field

The present disclosure relates to a stator of a rotary electric machine.

2. Description of the Related Art

As a stator that is incorporated in a rotary electric machine, a so-called stator with a bus ringless structure that does not employ a bus ring (an annular conductor) is known. For example, in a stator described in Japanese Unexamined Patent Application Publication No. 2012-228152, among coils of a plurality of phases that are wound around a plurality of teeth, coils of the same phase are connected in parallel with respect to each other. Each of the coils includes a coil winding portion that is wound around a tooth, a coil end that is drawn out from the coil winding portion and that is drawn around in a circumferential direction, and a connection portion that is a connection of one end portions of the coil ends of the same phase.

Furthermore, such a type of stator is provided with insulating members that include guide portions that guide the coil ends that have been drawn out from the coil winding portions to where the connection portions are positioned. A plurality of groove portions that houses the coil ends of the phases are formed in the guide portions of the insulating members. Each of the groove portions is formed with a first wall surface and a second wall surface that oppose each other and is open to at least an outer diameter side.

The insulating member described in Japanese Unexamined Patent Application Publication No. 2012-228152 includes convexities in the first wall surfaces and the second wall surfaces, in which the convexities bend and deform the coil ends when the coil ends are housed in the groove portions. Under these circumstances, after drawing the coil ends around the groove portions, due to a spring back effect, reaction force that returns the deformed portions of the coil ends to the convexity side acts on the deformed portions of the coil ends; accordingly, the deformed portions can be held by the convexities in a reliable manner.

SUMMARY

However, in such a type of stator, when one end portions of the coil ends of the same phase are drawn out from the groove portions towards the outer diameter side and are connected to each other, the one end portions of the coil ends of the same phase are drawn out so as to be aligned in the circumferential direction with a certain width. As a result, if the one end portions of the coil ends are drawn out to unsuitable positions, the one end portions of the coil ends become undesirably disarrayed such that in performing connection work by fusing or the like, correction of the orientation of the one end portions are disadvantageously required.

The present disclosure is disclosed in view of the problem described above and describes a stator of a rotary electric machine that is capable of suppressing disarray of the coil ends in the connection portion from occurring and that is capable of facilitating connection work.

A first aspect of the disclosure is a stator (a stator 10 of an exemplary embodiment described later, for example) of a rotary electric machine, including a plurality of teeth (teeth portion 24b of the exemplary embodiment described later, for example) that are disposed in a circumferential direction, coils (coils 18 of the exemplary embodiment described later, for example) of a plurality of phases that are wound around the teeth, and at least two or more coils of a same phase among the coils of the plurality of phases being connected in parallel with respect to each other. The coils include coil winding portions (coil winding portions 18b of the exemplary embodiment described later, for example) that are wound around the teeth, coil ends (coil ends 19a of the exemplary embodiment described later, for example) that are drawn out from the coil winding portions and that are drawn around in the circumferential direction, and connection portions (connection portions 19d and 19e of the exemplary embodiment described later, for example) that are each a connection of one end portions of the coils of the same phase among the coils of the plurality of phases. In the stator of a rotary electric machine, an insulating member (an insulator 26 of the exemplary embodiment described later, for example) in which a groove portion (lead wire end portion holding grooves 56a to 62a and 56b to 62b of the exemplary embodiment described later, for example) that is open towards at least an outer diameter side and that is formed with a first wall surface (first wall surfaces 56c to 62c of the exemplary embodiment described later, for example) and a second wall surface (second wall surfaces 56d to 62d of the exemplary embodiment described later, for example) that oppose each other are provided in each of the teeth, each of the coil ends is housed in a corresponding groove portion, a first convexity (first convexities 88a to 94a of the exemplary embodiment described later, for example) that protrudes towards a second wall surface side is formed on the first wall surface, a second convexity (second convexities 88b to 94b of the exemplary embodiment described later, for example) that protrudes towards a first wall surface side is formed on the second wall surface, the first convexity and the second convexity are formed at offset positions with respect to each other in the circumferential direction, and each of the connection portions is drawn out towards the outer diameter side from between the corresponding first convexity and second convexity. According to the first aspect of the disclosure, the one end portions of the coil ends that are drawn out are drawn out from the groove portions at a certain angle while being held by the first and second convexities; accordingly, when connecting the connection portions by fusing or the like, correction of the orientation of the coil ends is not needed or is facilitated and efficiency of the connection work can be improved.

In addition to the configuration of the first aspect, in a second aspect of the disclosure, each of the coils may include a neutral point connection portion (a neutral point connection portion 19d of the exemplary embodiment described later, for example) in which other end portions of the coil ends of the coils of the plurality of phases are connected to each other, and an interval (a width W5 of the exemplary embodiment described later, for example) between the first convexity and the second convexity may be larger than a width (a width W2 of the exemplary embodiment described later, for example) of the neutral point connection portion. According to the second aspect of the disclosure, the other end portions of the coil ends of the plurality of phases that are the neutral point connection portion can be also drawn out from between the first convexity and the second convexity towards the outer diameter side.

In addition to the configuration of the first aspect, in a third aspect of the disclosure, the first convexity and the second convexity in which the connection portion is drawn out towards the outer diameter side may be the first convexity and the second convexity that are formed in a single piece of the insulating member. According to the third aspect of the disclosure, the connection portion can be drawn out from between the first convexity and the second convexity of either of the insulating members towards the outer diameter side.

In addition to the configuration of the first aspect, in a fourth aspect of the disclosure, the first convexity and the second convexity in which the connection portion is drawn out towards the outer diameter side may be the first convexity of one of the adjoining insulating members and the second convexity of the other one of the adjoining insulating members, respectively. According to the fourth aspect of the disclosure, the connection portion can be drawn out from the first convexity of one of the adjoining insulating members and the second convexity of the other one of the adjoining insulating members towards the outer diameter side.

DETAILED DESCRIPTION

Hereinafter, an exemplary embodiment of a stator of a rotary electric machine of the present disclosure will be described with reference to the accompanying drawings. Note that the drawings are viewed in the direction of the reference numerals.

Figure 1:
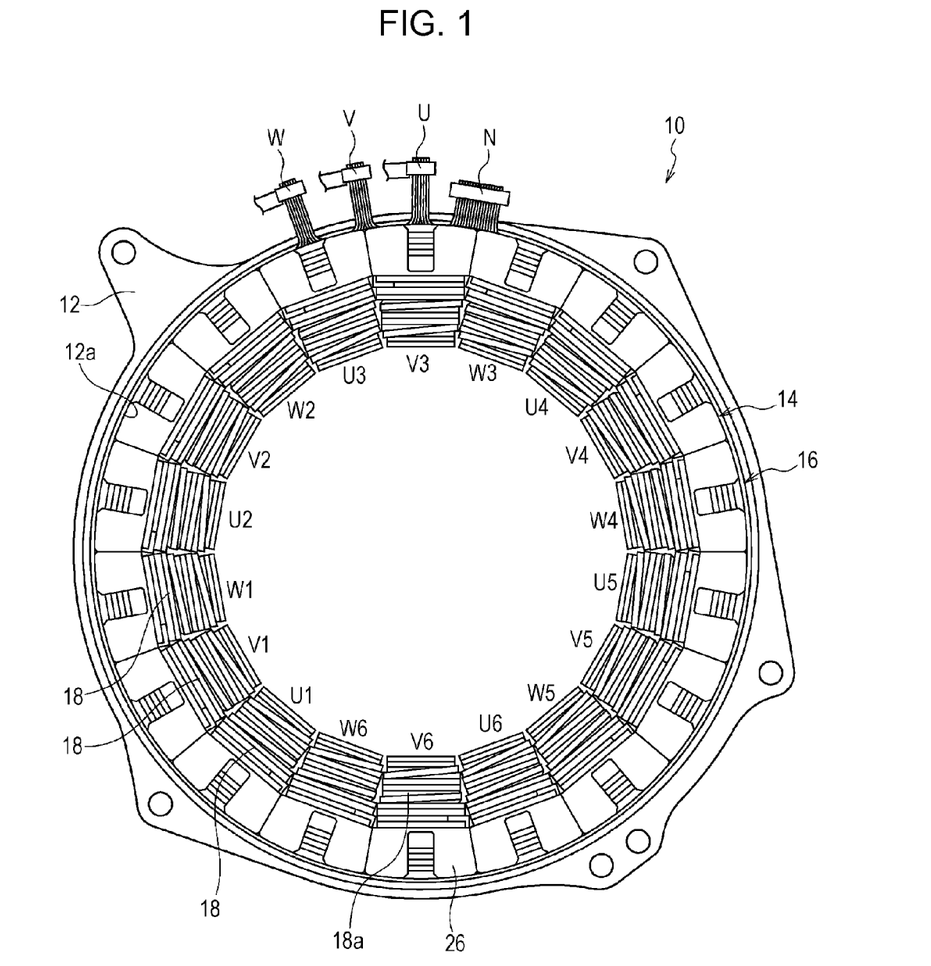
FIG. 1 is a plan view of a stator of a rotary electric machine according to an exemplary embodiment.

FIG. 1 is a plan view of a stator 10 of a rotary electric machine according to the present exemplary embodiment.

The stator 10 in combination with a rotor (not shown) provided therein constitutes a rotary electric machine and is used, for example, as an electric motor or a dynamo.

The stator 10 is a so-called stator with a salient pole winding and a three-phase Y connection and includes a hollow holder 12, bus bars U, V, and W that form three-phase input terminals, a neutral terminal N that forms a neutral point, and an annular stator group 16 that is formed by disposing a plurality of stator pieces 14 (18 pieces in FIG. 1) in an annular manner along an inner peripheral surface 12a of the holder 12.

The annular stator group 16 includes six stator pieces 14 each including a U-phase coil 18, six stator pieces 14 each including a V-phase coil 18, and six stator pieces 14 each including a W-phase coil 18. In the above case, the plurality of stator pieces 14 are arranged in an annular manner in the annular stator group 16 such that each of the U-phase (U1-phase to U6-phase), V-phase (V1-phase to V6-phase), and W-phase (W1-phase to W6-phase) coils 18 are disposed so as to be arranged in the order of U1, V1, W1, U2, . . . , U6, V6, and W6 in the clockwise direction in FIG. 1.

Subsequently, among the stator pieces 14 including the U1-phase to U6-phase, V1-phase to V6-phase, and W1-phase to W6-phase coils 18, a configuration of a single stator piece 14 will be representatively described. Note that the configuration of the stator piece 14 described herein is common among the stator pieces 14 of all of the phases.

Figure 2:
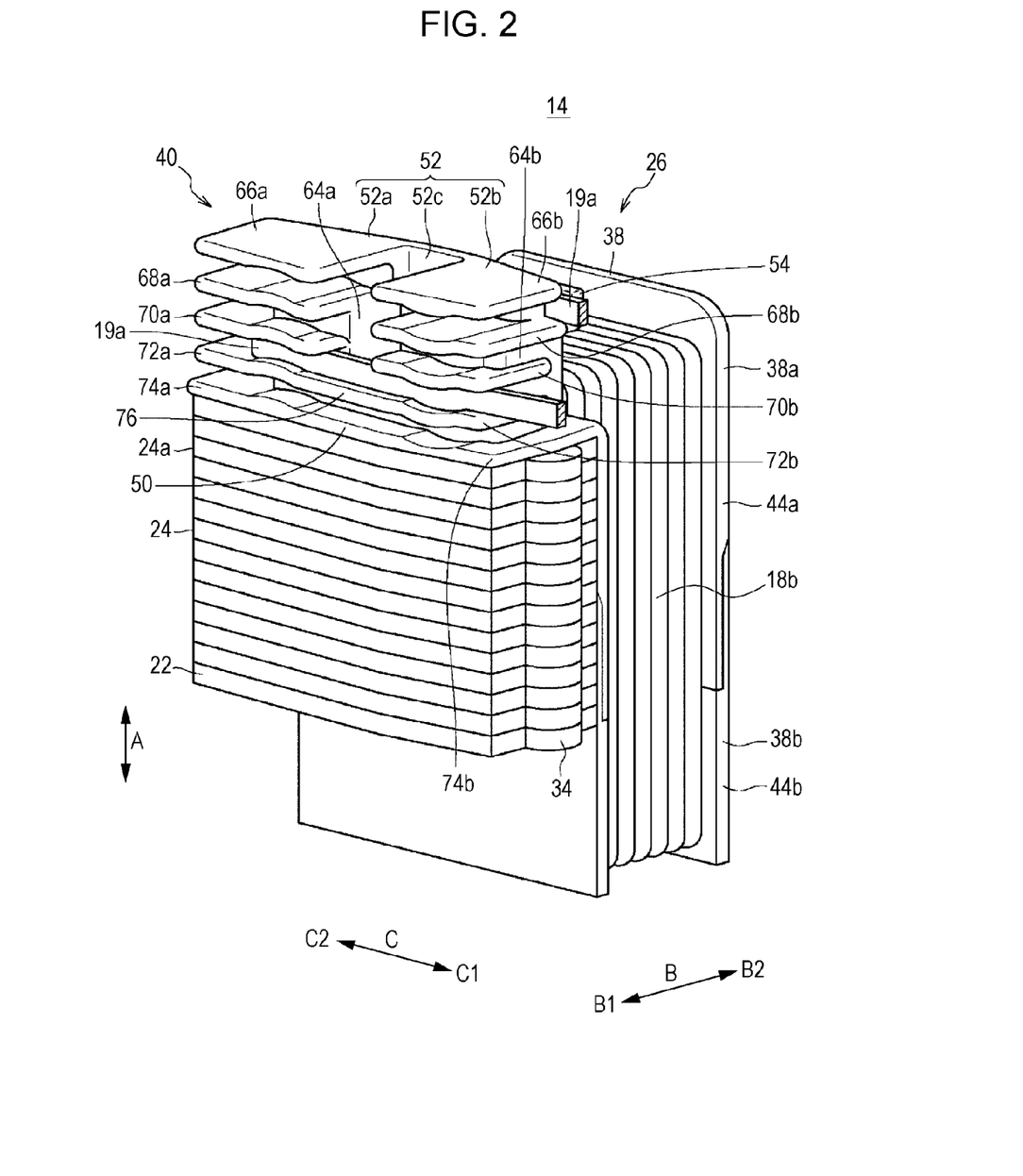
FIG. 2 is a perspective view of a stator piece in FIG. 1.
Figure 3:
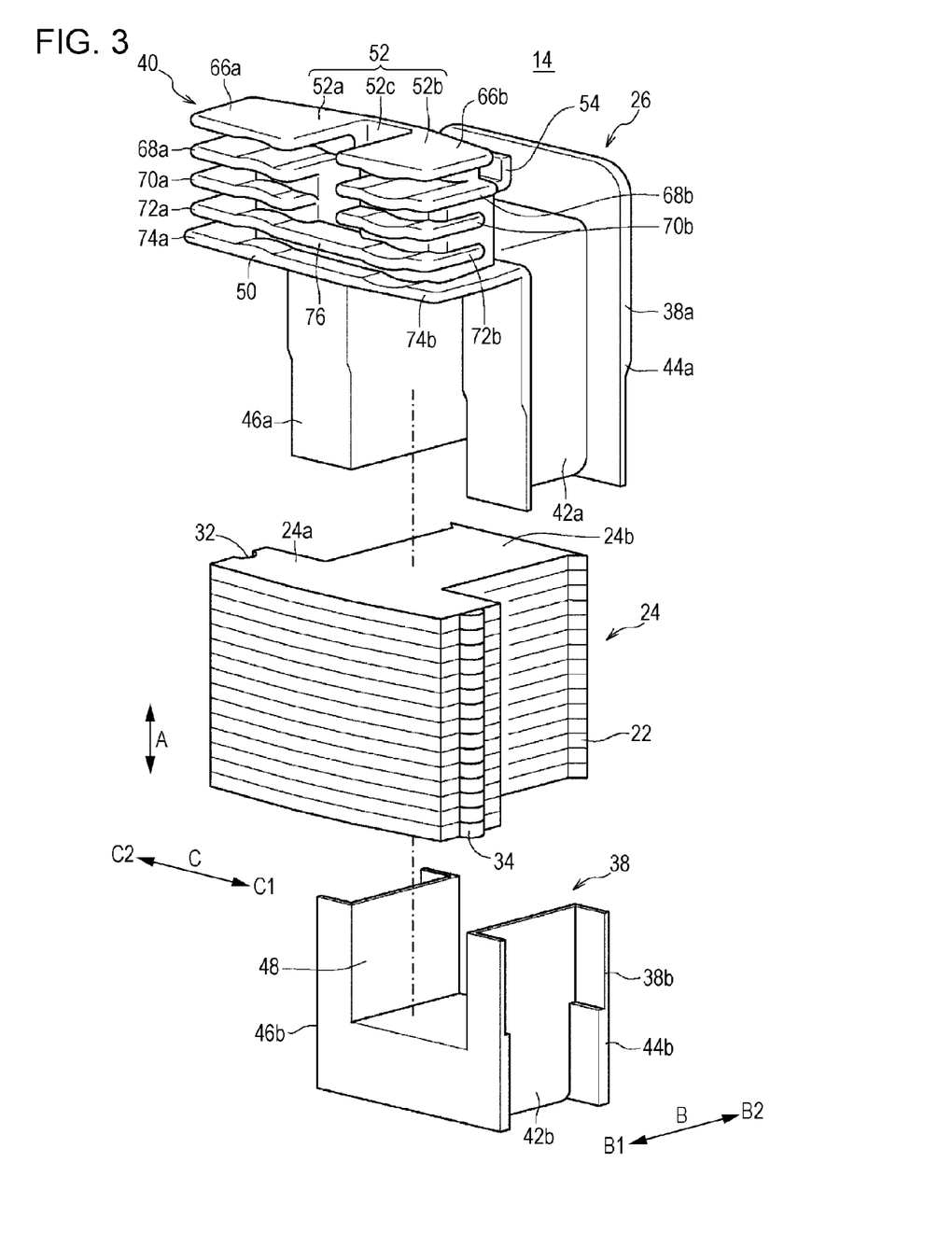
FIG. 3 is an exploded perspective view of the stator piece in FIG. 2.

As illustrated in FIGS. 2 and 3, each of the stator pieces 14 includes a split core 24 that is configured by stacking a plurality of substantially T-shaped metal pieces (steel plates) 22, which have been punched with a press, in a rotation axis direction (an arrow A direction), an insulator 26 that electrically insulates the split core 24, and a coil 18 that is configured by a winding 18a that is wound around the split core 24 through the insulator 26. The winding 18a is a rectangular wire with a rectangular cross-section.

The substantially T-shaped split core 24 includes a yoke portion 24a that extends in a circumferential direction (an arrow C direction) on an outer diameter side (an arrow B1 direction), and a tooth portion 24b that extends from the yoke portion 24a towards an inner diameter side (an arrow B2 direction). Furthermore, a substantially semicircular fitting recess 32 is formed in an end portion of the yoke portion 24a in an arrow C2 direction and a substantially semicircular fitting protrusion 34 that corresponds to the fitting recess 32 is formed on an end portion of the yoke portion 24a in an arrow C1 direction.

The insulator 26 is configured by a flexible electrical insulating material such as a resin. The insulator 26 includes a winding portion 38 around which a coil winding portion 18b of the winding 18a is wound and a guide portion 40 that protrudes in the arrow B1 direction from the winding portion 38 and that is for drawing around and guiding lead wires (the start end portions or the terminal end portions of the lead wires) of the windings 18a in the arrow C direction to the bus bars U, V, or W and to the neutral terminal N. Note that in the lead wires of the windings 18a, the portions that are drawn around and are guided in the circumferential direction (the arrow C direction) with the guide portion 40 are, hereinafter, referred to as coil ends 19a.

The winding portion 38 includes an upper side winding portion 38a and a lower side winding portion 38b that are capable of being fitted to each other in the arrow A direction.

The upper side winding portion 38a includes an upper side winding portion body 42a formed so as to have a substantially U-shaped cross-section, an upper side inner peripheral wall 44a that is provided so as to stand in the end portion of the upper side winding portion body 42a on the inner diameter side (the arrow B2 direction), and an upper side outer peripheral wall 46a that is provided so as to stand in the end portion of the upper side winding portion body 42a in the arrow B1 direction so as to oppose the upper side inner peripheral wall 44a.

The lower side winding portion 38b includes a lower side winding portion body 42b formed so as to have a substantially U-shaped cross-section so as to oppose the upper side winding portion body 42a, a lower side inner peripheral wall 44b that is provided so as to stand in the end portion of the lower side winding portion body 42b in the arrow B2 direction so as to oppose the upper side inner peripheral wall 44a, and a lower side outer peripheral wall 46b that is provided so as to stand in the end portion of the lower side winding portion body 42b in the arrow B1 direction so as to oppose the lower side inner peripheral wall 44b.

Accordingly, when the upper side winding portion 38a and the lower side winding portion 38b are fitted together while holding the tooth portion 24b of the split core 24 in between, the upper side winding portion body 42a and the lower side winding portion body 42b, the upper side inner peripheral wall 44a and the lower side inner peripheral wall 44b, and the upper side outer peripheral wall 46a and the lower side outer peripheral wall 46b are coupled to each other while having some portions overlap each other. In other words, by inserting the lower side winding portion 38b to the upper side winding portion 38a from below, the upper side winding portion 38a and the lower side winding portion 38b become integrated thus forming the winding portion 38, and a hole 48 is formed in the center portion of the winding portion 38 in the arrow B direction. With the above, the tooth portion 24b is fitted into the hole 48 and, further, by winding the winding 18a around a portion in the winding portion 38 between the upper side inner peripheral wall 44a and the lower side inner peripheral wall 44b and a portion in the winding portion 38 between the upper side outer peripheral wall 46a and the lower side outer peripheral wall 46b, the coil winding portion 18b is configured.

Meanwhile, the guide portion 40 is provided so as to protrude in the arrow B1 direction from a vicinity of the upper end portion of the upper side outer peripheral wall 46a.

The guide portion 40 includes a tabular member 50, a lead wire housing portion 52 that is formed on the tabular member 50 and that has a substantially U-shape in plan view in FIG. 1, and a terminal end fixing portion 54 that is formed behind the lead wire housing portion 52 (a portion on the arrow C1 direction side in the back surface in the arrow B2 direction) and that fixes the terminal end portion of the winding 18a wound around the winding portion 38.

The lead wire housing portion 52 is configured so as to allow the coil end 19a, which is a lead wire of the winding 18a that is wound around the winding portion 38, to be housed in the arrow C direction.

Figure 4:
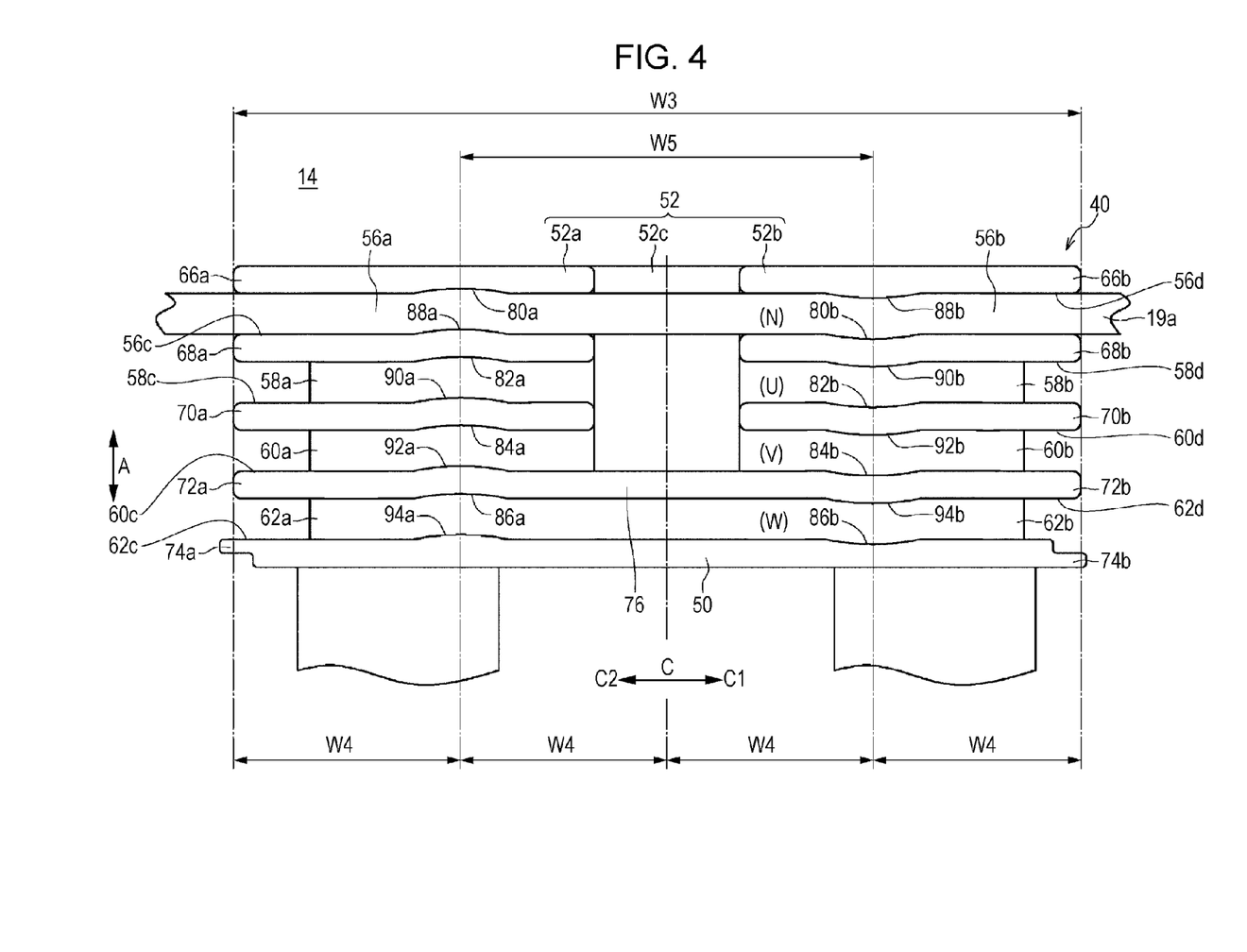
FIG. 4 is a partial front view of an insulator in FIG. 2.

In other words, the lead wire housing portion 52 includes blocks 52a and 52b that are provided so as to stand on the tabular member 50 on the arrow C2 direction side and on the arrow C1 direction side, respectively, and a connection portion 52c that connects the back surfaces of the blocks 52a and 52b in the arrow B2 direction. As illustrated in FIG. 4, in the block 52a, lead wire end portion holding grooves 56a to 62a that extend in the arrow C direction and that have widths in the rotation axis direction (lengths in the arrow A direction) and widths in the radial direction (lengths in the arrow B direction) that are capable of housing the coil ends 19a of the windings 18a therein are provided at predetermined intervals in the rotation axis direction (the arrow A direction). Meanwhile, in a similar manner to that of the block 52a, in the block 52b as well, lead wire end portion holding grooves 56b to 62b that extend in the arrow C direction and that have widths in the rotation axis direction and widths in the radial direction that are capable of housing the coil ends 19a of the windings 18a therein are provided at predetermined intervals in the arrow A direction. Note that as illustrated in FIGS. 2 to 5, the lead wire end portion holding groove 56a and the lead wire end portion holding groove 56b, the lead wire end portion holding groove 58a and the lead wire end portion holding groove 58b, the lead wire end portion holding groove 60a and the lead wire end portion holding groove 60b, and the lead wire end portion holding groove 62a and the lead wire end portion holding groove 62b are formed in a substantially same shape with respect one another.

Furthermore, in the block 52a, the portions that define the lead wire end portion holding grooves 56a to 62a are configured as eaves-like wall portions 66a to 74a that extend in the arrow B1 direction and in the arrow C2 direction in a tabular manner from a body portion 64a of the block 52a. Similar to the block 52a, in the block 52b as well, the portions that define the lead wire end portion holding grooves 56b to 62b are configured as eaves-like wall portions 66b to 74b that extend in the arrow B1 direction and in the arrow C1 direction in a tabular manner from a body portion 64b of the block 52b. Note that the wall portions 72a and 72b are connected to each other in the arrow C direction through the connection portion 76.

Figure 5:
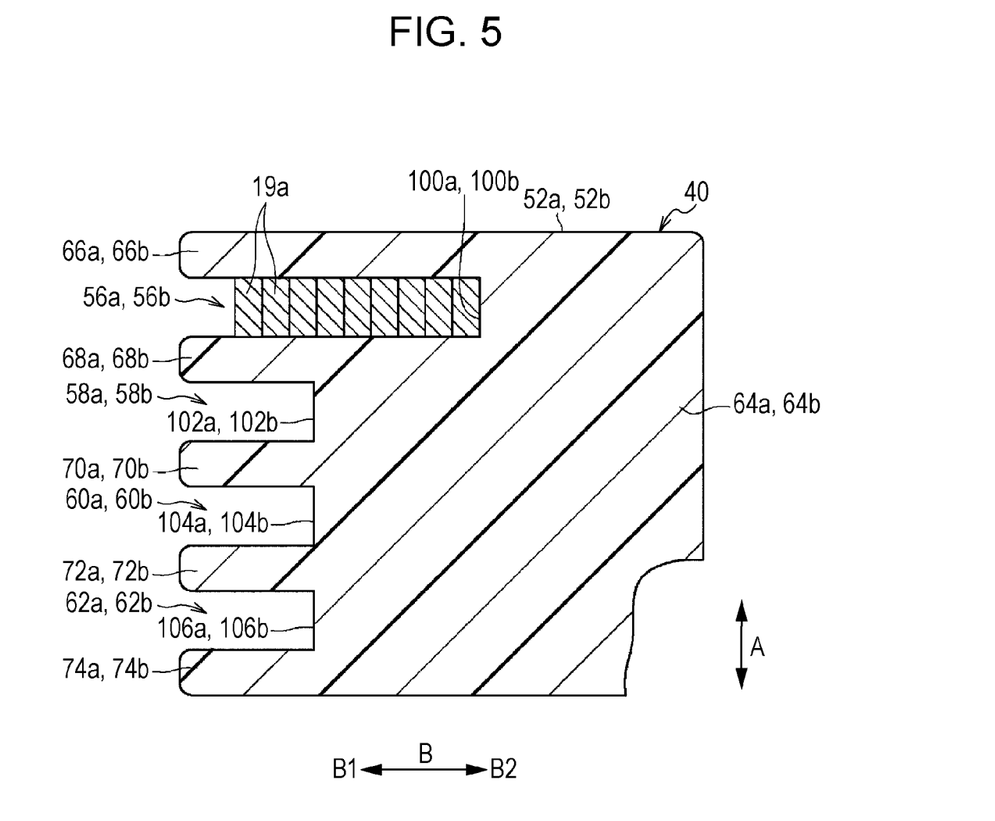
FIG. 5 is a partial cross-sectional view of the insulator in FIG. 2.

Incidentally, the windings 18a that are rectangular wires with the same shape are each wound around the stator pieces 14 such that coils 18 are configured in the annular stator group 16. In the lead wire housing portion 52, while the long side of the rectangular wires are oriented in the arrow A direction (see FIG. 5), the coil ends 19a of the windings 18a are drawn around in the arrow C direction and are housed in the lead wire end portion holding grooves 56a to 62a and 56b to 62b. With the above, the short sides of the rectangular wires come in contact with the inner walls of the lead wire end portion holding grooves 56a to 62a and 56b to 62b, and the coil ends 19a are held by the lead wire end portion holding grooves 56a to 62a and 56b to 62b. As illustrated in FIGS. 4 and 5, each of the lead wire end portion holding grooves 56a to 62a and 56b to 62b has substantially the same shape. Furthermore, as illustrated in FIG. 5, among the lead wire end portion holding grooves 56a to 62a and 56b to 62b, the widths of the uppermost lead wire end portion holding grooves 56a and 56b in the radial direction (the lengths in the arrow B direction) are larger than the widths of the other lead wire end portion holding grooves 58a to 62a and 58b to 62b in the radial direction. Furthermore, the widths of the other lead wire end portion holding grooves 58a to 62a and 58b to 62b in the radial direction are substantially the same.

Furthermore, the coil ends 19a of the windings 18a of the same phase are drawn around and housed in the lead wire end portion holding groove 56a and the lead wire end portion holding groove 56b, the lead wire end portion holding groove 58a and the lead wire end portion holding groove 58b, the lead wire end portion holding groove 60a and the lead wire end portion holding groove 60b, and the lead wire end portion holding groove 62a and the lead wire end portion holding groove 62b.

Note that as for the coil ends 19a that are housed in the lead wire end portion holding grooves 56a and the lead wire end portion holding grooves 56b, the coil ends 19a that constitute the U1-phase to U3-phase, the V1-phase to V3-phase, the W1-phase, the W2-phase, and the W6-phase coils 18 are drawn around in one circumferential direction (clockwise in FIG. 1) and the coil ends 19*a* that constitute the U4-phase to U6-phase, the V4-phase to V6-phase, and the W3-phase to W5-phase coils 18 are drawn around in the other circumferential direction (anticlockwise in FIG. 1).

Furthermore, as for the coil ends 19*a* that are housed in the lead wire end portion holding grooves 58*a* and the lead wire end portion holding grooves 58*b*, the coil ends 19*a* that constitute the U1-phase to U3-phase coils 18 are drawn around in one circumferential direction (clockwise in FIG. 1) and the coil ends 19*a* that constitute the U4-phase to U6-phase coils 18 are drawn around in the other circumferential direction (anticlockwise in FIG. 1).

Furthermore, as for the coil ends 19*a* that are housed in the lead wire end portion holding groove 60*a* and lead wire end portion holding groove 60*b*, the coil ends 19*a* that constitute the V1-phase, V2-phase, and V6-phase coils 18 are drawn around in one circumferential direction (clockwise in FIG. 1) and the coil ends 19*a* that constitute the V3-phase to V5-phase coils 18 are drawn around in the other circumferential direction (anticlockwise in FIG. 1).

Furthermore, as for the coil ends 19*a* that are housed in the lead wire end portion holding groove 62*a* and lead wire end portion holding groove 62*b*, the coil ends 19*a* that constitute the W1-phase, W2-phase, and W6-phase coils 18 are drawn around in one circumferential direction (clockwise in FIG. 1) and the coil ends 19*a* that constitute the W3-phase to W5-phase coils 18 are drawn around in the other circumferential direction (anticlockwise in FIG. 1).

Figure 7:
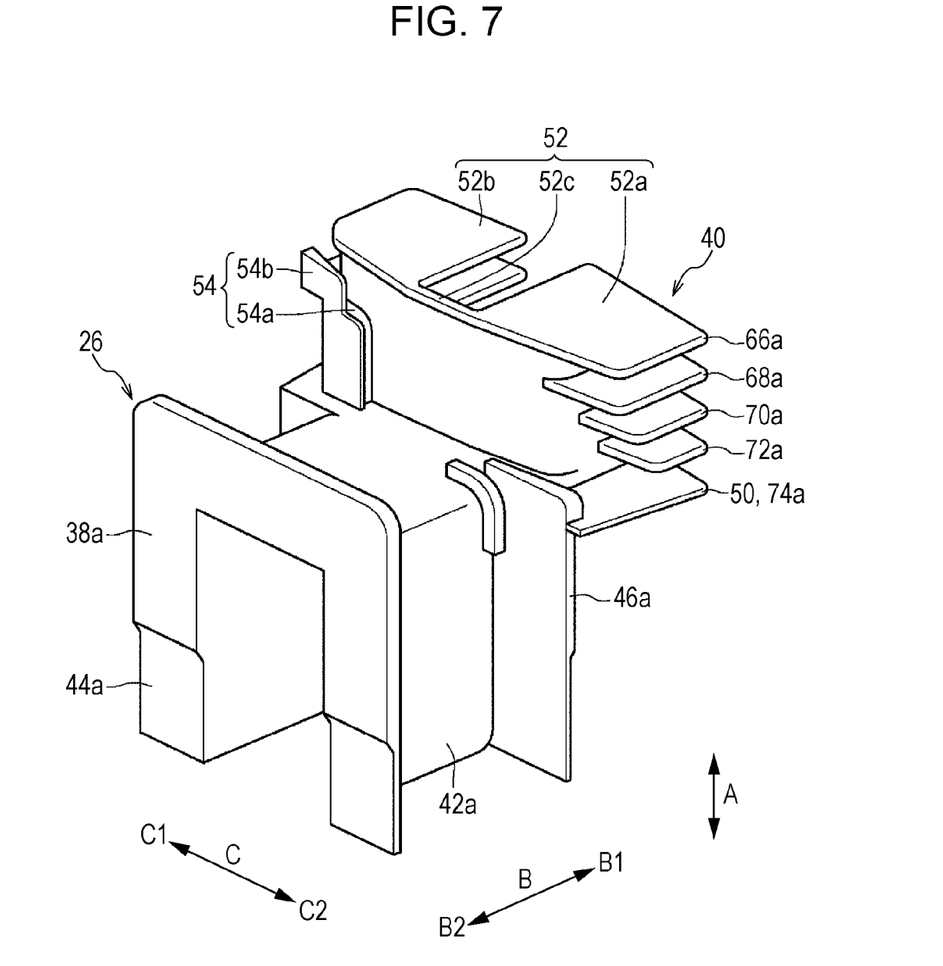
FIG. 7 is a partial perspective view of the insulator in FIG. 2.

Accordingly, nine windings 18*a* from the U1-phase to U3-phase, the V1-phase to V3-phase, the W1-phase, the W2-phase, and the W6-phase, or nine windings 18*a* from the U4-phase to U6-phase, the V4-phase to V6-phase, the W3-phase to W5-phase are wound around and are housed in the lead wire end portion holding grooves 56*a* and 56*b* that have the largest width in the radial direction. In the above case, the terminal end fixing portion 54 that fixes the terminal end portion of the winding 18*a* is disposed behind the block 52*b*. As illustrated in FIG. 7, the terminal end fixing portion 54 has a width that is substantially the same as the width of the long side of the winding 18*a* and includes an erect portion 54*a* that stands erect along the block 52*b* in the arrow A direction and a wall portion 54*b* that bulges out from the arrow B2 direction side of the erect portion 54*a*. Accordingly, in each of the stator pieces 14, the terminal end portion of the winding 18*a* wound around the winding portion 38 thereof is fixed to the terminal end fixing portion 54 and is drawn around the lead wire end portion holding grooves 56*a* and 56*b* while the long side of the rectangular wire extends along the surface of the erect portion 54*a* and the short sides thereof extend along the wall portion 54*b* and the block 52*b*. Note that in FIG. 5, as an example of the drawing around process, the coil ends 19*a* are illustrated in which each of the windings 18*a* is drawn around and housed in the lead wire end portion holding grooves 56*a* and 56*b*.

Furthermore, as for the lead wire end portion holding grooves 58*a* to 62*a* and 58*b* to 62*b* that have widths in the radial direction that are smaller than the widths of the lead wire end portion holding grooves 56*a* and 56*b*, a total of three U1-phase to U3-phase windings 18*a* or three U4-phase to U6-phase windings 18*a* are drawn around and housed in the lead wire end portion holding grooves 58*a* and 58*b*, a total of three V1-phase, V2-phase, and V6-phase coil windings 18*a* or three V3-phase to V5-phase windings 18*a* are drawn around and housed in the lead wire end portion holding grooves 60*a* and 60*b*, and a total of three W1-phase, W2-phase, W6-phase windings 18*a* or three W3-phase to W5-phase windings 18*a* are drawn around and housed in the lead wire end portion holding grooves 62*a* and 62*b*.

As described above, the lead wire end portion holding grooves 56*a* and 56*b* house the coil ends 19*a* of the windings 18*a* of all the phases and configure housing portions in which the coil ends 19*a* are drawn around in the circumferential direction, and the lead wire end portion holding grooves 58*a* to 62*a* and 58*b* to 62*b* each house the coil ends 19*a* of the windings 18*a* of the corresponding phase and each configure a housing portion in which the corresponding coil ends 19*a* are drawn around in the circumferential direction.

Furthermore, a convexity or a concavity that extends in the arrow B direction is formed in each of the wall portions 66*a* to 74*a* and 66*b* to 74*b* so as to face the corresponding lead wire end portion holding grooves 56*a* to 62*a* and 56*b* to 62*b*.

Specifically, arcuate first concavities 80*a* to 86*a* that extend in the arrow B direction are formed on the undersides of the wall portions 66*a* to 72*a* in the block 52*a*, respectively, so as to face the lead wire end portion holding grooves 56*a* to 62*a*, respectively. Meanwhile, arcuate first convexities 88*a* to 94*a* that extend in the arrow B direction are formed on the upper surfaces of the wall portions 68*a* to 74*a*, respectively, so as to face the lead wire end portion holding grooves 56*a* to 62*a*, respectively, and so as to oppose the first concavities 80*a* to 86*a*, respectively.

Conversely, in the block 52*b*, while second convexities 88*b* to 94*b* are formed on the undersides of the wall portions 66*b* to 72*b*, second concavities 80*b* to 86*b* are formed on the upper surfaces of the wall portions 68*b* to 74*b*.

Specifically, arcuate second convexities 88*b* to 94*b* that extend in the arrow B direction are formed on the undersides of the wall portions 66*b* to 72*b*, respectively, so as to face the lead wire end portion holding grooves 56*b* to 62*b*, respectively. Meanwhile, arcuate second concavities 80*b* to 86*b* that extend in the arrow B direction are formed on the upper surfaces of the wall portions 68*b* to 74*b*, respectively, so as to face the lead wire end portion holding grooves 56*b* to 62*b*, respectively, and so as to oppose the second convexities 88*b* to 94*b*, respectively.

Now, as illustrated in FIGS. 4 and 5, when the coil end 19*a* of each of the windings 18*a* is drawn around the corresponding one of the lead wire end portion holding grooves 56*a* to 62*a* and 56*b* to 62*b* while the long side of the corresponding rectangular wire is extended along the corresponding one of the bottom surfaces 100*a* to 106*a* and 100*b* to 106*b* (the front sides of the body portions 64*a* and 64*b* in the arrow B1 direction) of the corresponding one of the lead wire end portion holding grooves 56*a* to 62*a* and 56*b* to 62*b*, the coil end 19*a* of each of the windings 18*a* is housed in the following manner.

In other words, as described above, in each of the stator pieces 14, the first concavities 80*a* to 86*a* are formed on the undersides of the wall portions 66*a* to 72*a* of one block 52*a* so as to face the lead wire end portion holding grooves 56*a* to 62*a*, and facing the lead wire end portion holding grooves 56*a* to 62*a*, the first convexities 88*a* to 94*a* are formed on the upper surfaces of the wall portions 68*a* to 74*a* so as to oppose the first concavities 80*a* to 86*a*. Furthermore, the second convexities 88*b* to 94*b* are formed on the undersides of the wall portions 66*b* to 72*b* of the other block 52*b* so as to face the lead wire end portion holding grooves 56*b* to 62*b*, and facing the lead wire end portion holding grooves 56*b* to 62*b*, the second concavities 80*b* to 86*b* are formed on the upper surfaces of the wall portions 68b to 74b so as to oppose the second convexities 88b to 94b.

Figure 6:
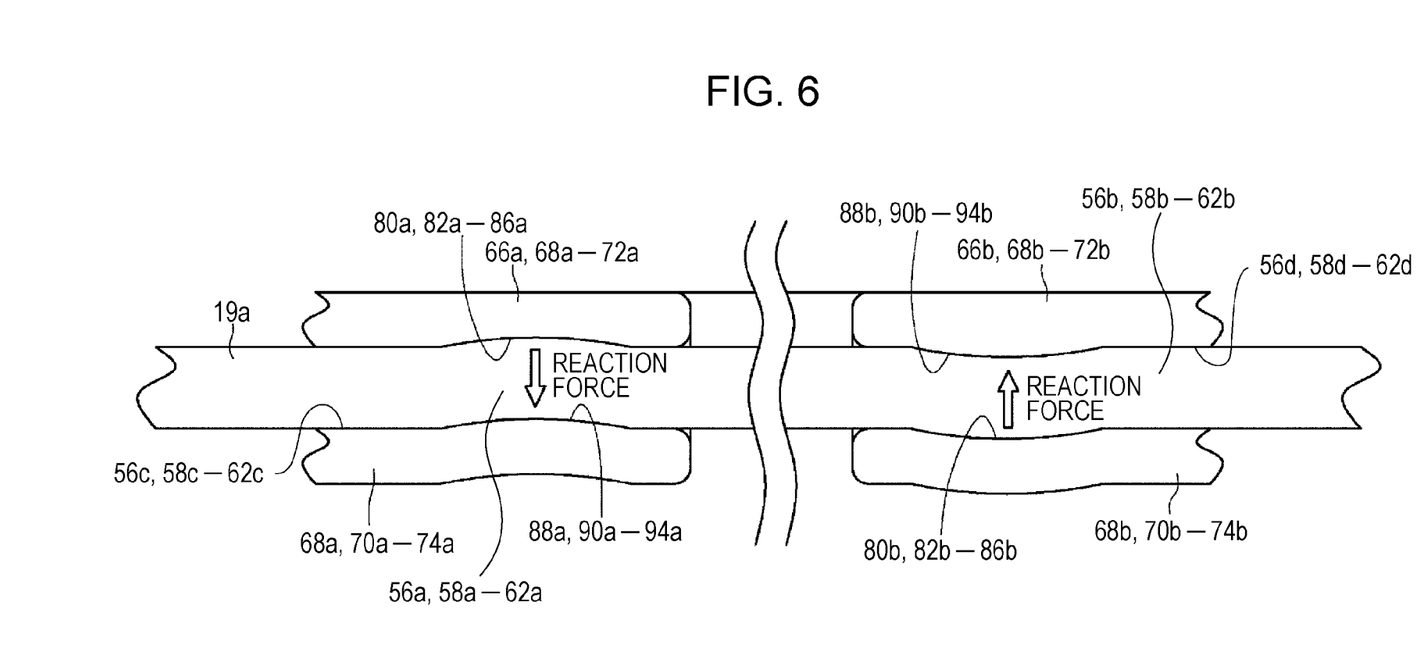
FIG. 6 is an explanatory drawing schematically illustrating a state in which a coil end is housed in a lead wire end portion holding groove.

In other words, in the front views of FIGS. 4 and 6, in the lead wire end portion holding groove 56a and the lead wire end portion holding groove 56b, the lead wire end portion holding groove 58a and the lead wire end portion holding groove 58b, the lead wire end portion holding groove 60a and the lead wire end portion holding groove 60b, and the lead wire end portion holding groove 62a and the lead wire end portion holding groove 62b, the concavities 80a to 86a and 80b to 86b and the convexities 88a to 94a and 88b to 94b are provided alternatively in the arrow C direction such that wavy-shapes are formed.

In other words, the lead wire end portion holding grooves 56a to 62a and 56b to 62b are formed by first wall surfaces 56c, 58c, 60c, and 62c and second wall surfaces 56d, 58d, 60d, and 62d that oppose each other. The first convexities 88a to 94a that protrude towards the first concavities 80a to 86a formed in the second wall surfaces 56d, 58d, 60d, and 62d are formed on the first wall surfaces 56c, 58c, 60c, and 62c, and the second convexities 88b to 94b that protrude towards the second concavities 80b to 86b formed in the first wall surfaces 56c, 58c, 60c, and 62c are formed on the second wall surfaces 56d, 58d, 60d, and 62d. The first convexities 88a to 94a and the second convexities 88b to 94b are formed at positions that are offset with respect each other in the circumferential direction (the arrow C direction).

Accordingly, when each coil end 19a is housed in the corresponding one of the lead wire end portion holding grooves 56a to 62a and 56b to 62b, each coil end 19a is deformed (bent) along the corresponding one of the concavities 80a to 86a and 80b to 86b and convexities 88a to 94a and 88b to 94b. As a result, after the coil ends 19a are drawn around, due to a spring back effect, reaction force returning the deformed portions that have been bent by the concavities 80a to 86a and 80b to 86b and convexities 88a to 94a and 88b to 94b towards the convexities 88a to 94a and 88b to 94b sides acts on the deformed portions. With the above reaction force, the deformed portions are urged against the convexities 88a to 94a and 88b to 94b and, as a result, the coil end 19a of each of the windings 18a is housed in a wavy manner in the corresponding one of the lead wire end portion holding grooves 56a to 62a and 56b to 62b while being reliably held by the convexities 88a to 94a and 88b to 94b. Accordingly, while the rotary electric machine is in operation, the windings 18a being rubbed against the wall portions 66a, 66b, 68a, and 68b due to vibration and the insulating layers of the windings 18a becoming damaged can be suppressed. Note that since the concavities 80a to 86a and 80b to 86b are components that are associated with the convexities 88a to 94a and 88b to 94b, description thereof are omitted hereinafter.

Furthermore, as illustrated in FIG. 1, as for the coil ends 19a that are housed in the lead wire end portion holding grooves 56a and 56b, the lead wires of the nine windings 18a that are drawn around in one circumferential direction (clockwise in FIG. 1) and the lead wires of the nine windings 18a that are drawn around in the other circumferential direction (anticlockwise in FIG. 1) are merged at a position that overlaps with the neutral terminal N in the circumferential direction.

In a similar manner, as for the coil ends 19a that are housed in the lead wire end portion holding grooves 58a to 62a and 58b and 62b, the lead wires of the three windings 18a that are drawn around in one circumferential direction (clockwise in FIG. 1) and the lead wires of the three windings 18a that are drawn around in the other circumferential direction (anticlockwise in FIG. 1) are merged at positions that overlap the bus bars U, V, and W in the circumferential direction.

Figure 8A:
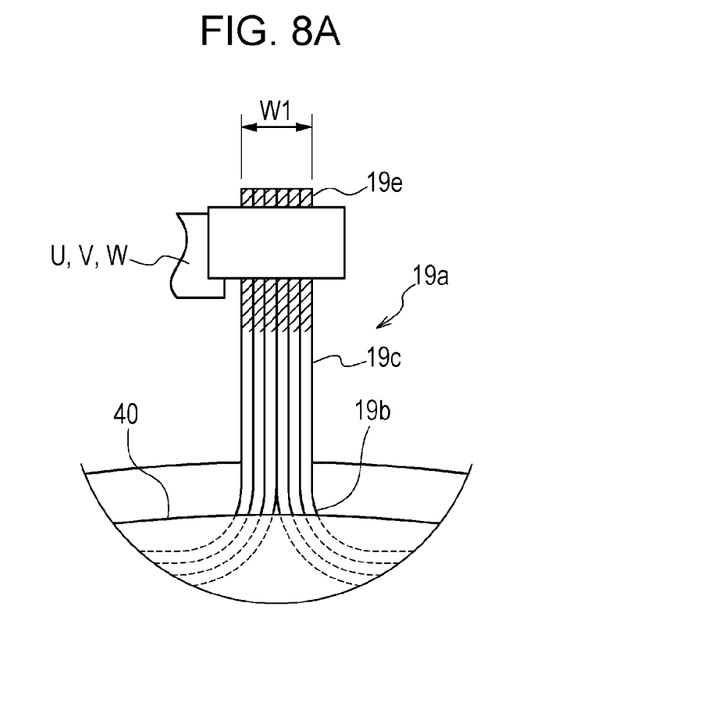
FIG. 8A is an enlarged view of a connection portion and FIG. 8B is an enlarged view of a neutral point connection portion.
Figure 8B:
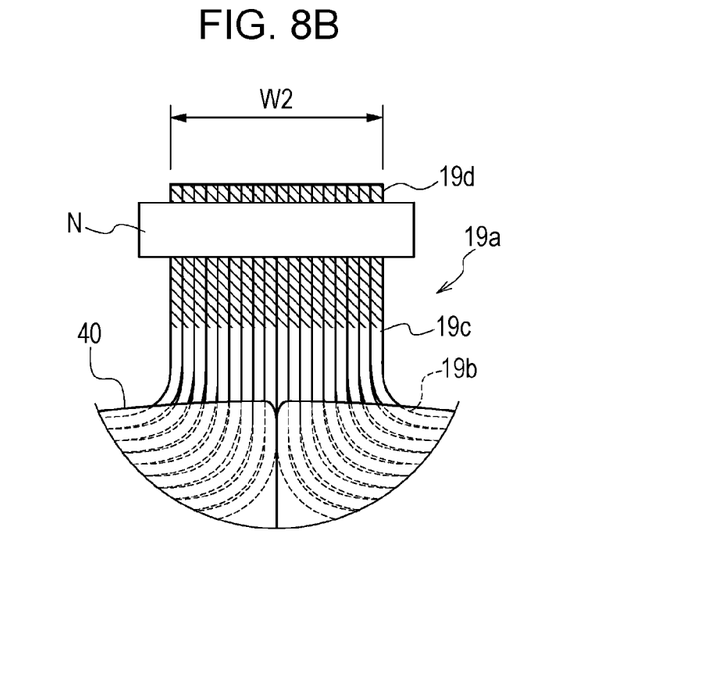

As illustrated in FIGS. 8A and 8B, the merged coil ends 19a of the windings 18a form bent portions 19b that are bent towards the outer portions (the outer diameter side) of the lead wire end portion holding grooves 56a to 62a and 56b to 62b and, further, form extension portions 19c that extend towards the outer diameter side from the relevant bent portions 19b. Furthermore, the coil ends 19a of the plurality of windings 18a include connection portions 19d and 19e that have been coupled to the neutral terminal N and the bus bars U, V, and W by fusing the outer diameter ends of the extension portions 19c. Note that in the following description, the connection portion 19d may be referred to as a neutral point connection portion 19d.

As illustrated in FIG. 8A, the connection portions 19e that are coupled to the bus bars U, V, and W each include six coil ends 19a that are arranged in the circumferential direction, the width of which in the circumferential direction is width W1 that corresponds to the thickness of the six coil ends 19a. Furthermore, as illustrated in FIG. 8B, the neutral point connection portion 19d that is coupled to the neutral terminal N includes 18 coil ends 19a that are arranged in the circumferential direction, the width of which in the circumferential direction is width W2 (W2=W1×3) that corresponds to the thickness of the 18 coil ends 19a.

Meanwhile, as illustrated in FIG. 4, the guide portion 40 of the insulator 26 has a predetermined width W3 in the circumferential direction, and the first convexities 88a to 94a and the second convexities 88b to 94b are disposed in the width W3. In the present exemplary embodiment, assuming that a width obtained by dividing the width W3 of the guide portion 40 into four equal portions is W4 (W4=W3/4), then the distances from one end portions of the guide portion 40 in the circumferential direction to the apexes of the first convexities 88a to 94a are W4, the distances from the other end portions of the guide portion 40 in the circumferential direction to the apexes of the second convexities 88b to 94b are W4, and the distances between the apexes of the first convexities 88a to 94a to the apexes of the second convexities 88b to 94b are W5 (W5=W4×2) that is twice of W4. With the above, the distances between the apexes of the first convexities 88a to 94a of one of the adjoining insulators 26 and the apexes of the second convexities 88b to 94b of the other one of the adjoining insulators 26 can be W5 as well.

The widths W5 between the apexes of the first convexities 88a to 94a and the apexes of the second convexities 88b to 94b are, at the least, set larger than the widths W1 of the connection portions 19e that are coupled to the bus bars U, V, and W and, preferably, are set larger than the width W2 of the neutral point connection portion 19d that is coupled to the neutral terminal N. In the present exemplary embodiment, the widths W5 between the apexes of the first convexities 88a to 94a and the apexes of the second convexities 88b to 94b are set so as to be larger than either of the widths W1 and W2 of the connection portions 19d and 19e.

As illustrated in FIGS. 1 and 8A to 10, the coil ends 19a constituting the connection portions 19d and 19e are drawn out in the outer diameter direction from each of the lead wire end portion holding grooves 56a to 62a and 56b to 62b at predetermined positions in the circumferential direction that have been set in advance. The above drawing out of the coil ends 19a is performed between the first convexities 88a to 94a and the second convexities 88b to 94b. For example, in FIG. 9, the coil ends 19a that are to become the connection portions 19e are drawn out from between the first convexities 88a to 94a and the second convexities 88b to 94b of one of the insulators 26, and in FIG. 10, the coil ends 19a that are to become the connection portions 19e are drawn out from between the first convexities 88a to 94a of one of the adjoining insulators 26 and the second convexities 88b to 94b of the other one of the adjoining insulators 26. Not that while in FIGS. 9 and 10, a description has been given using the connection portions 19e as an example, the same applies to the connection portion 19d as well.

As illustrated in FIG. 1, in the present exemplary embodiment, the coil ends 19a of the U-phase coils 18 that are connected to the bus bar U are drawn out from between the first convexity 90a and the second convexity 90b of an insulator 26, the coil ends 19a of the W-phase coils 18 that are connected to the bus bar W are drawn out from between the first convexity 94a and the second convexity 94b of an insulator 26, and the coil ends 19a of the V-phase coils 18 that are connected to the bus bar V are drawn out from between the second convexity 92b of an insulator 26 and the first convexity 92a of an adjoining insulator 26, and the coil ends 19a of the U-phase, V-phase, and W-phase coils 18 that are connected to the neutral terminal N are drawn out from between the second convexity 88b of one of the adjoining insulators 26 and the first convexity 88a of the other one of the adjoining insulators 26.

Figure 9:
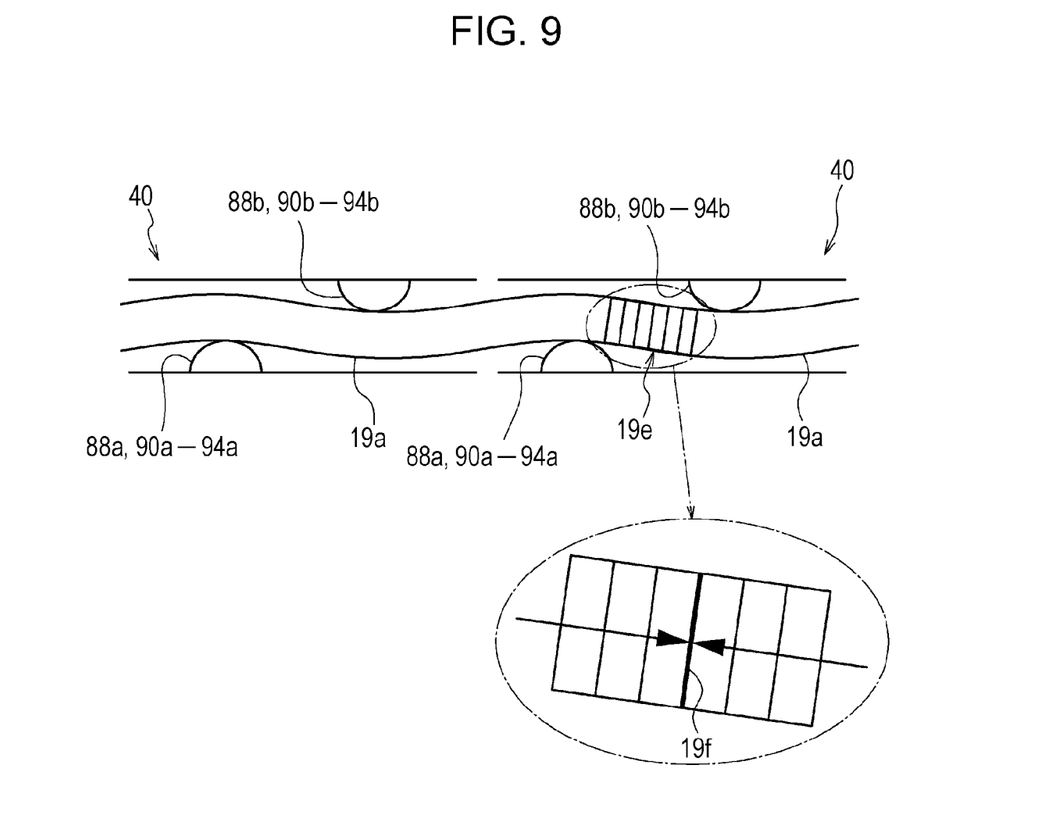
FIG. 9 is an explanatory drawing schematically illustrating an example in which the connection portion is drawn out from between the first convexity and the second convexity of a single insulator.
Figure 10:
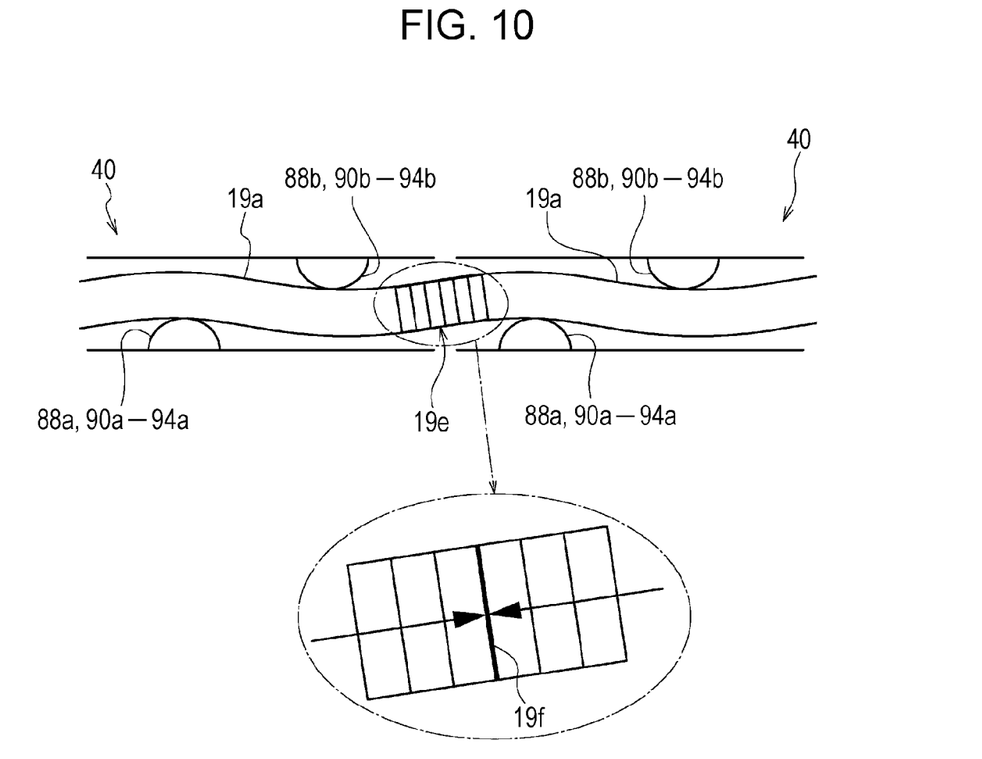
FIG. 10 is an explanatory drawing schematically illustrating an example in which the connection portion is drawn out from the first convexity of one of the adjoining insulating members and the second convexity of the other one of the adjoining insulating members.

Furthermore, as illustrated in FIGS. 9 and 10, the coil ends 19a that have been drawn out from each of the first convexities 88a to 94a and the corresponding one of the second convexities 88b to 94b are drawn out from the lead wire end portion holding grooves 56a to 62a and 56b to 62b at a certain angle while being held by the first convexities 88a to 94a and the second convexities 88b to 94b. Accordingly, the lead wires of the three (or nine) windings 18a that are drawn around in one circumferential direction (clockwise in FIG. 1) and the lead wires of the three (or nine) windings 18a that are drawn around in the other circumferential direction (anticlockwise in FIG. 1) are drawn out while the parallel state of the opposing surfaces 19f of the lead wires are maintained. Furthermore, since the coil ends 19a that are drawn out are drawn around in two directions and are merged, and are drawn out from the lead wire end portion holding grooves 56a to 62a and 56b to 62b through the bent portions 19b that have been bent and deformed, the coil ends 19a that have been drawn out at a certain angle from between the first convexities 88a to 94a and the second convexities 88b to 94b proactively gather together and arrange themselves in a single row due to the spring back effect of the bent portions 19b.

Figure 11:
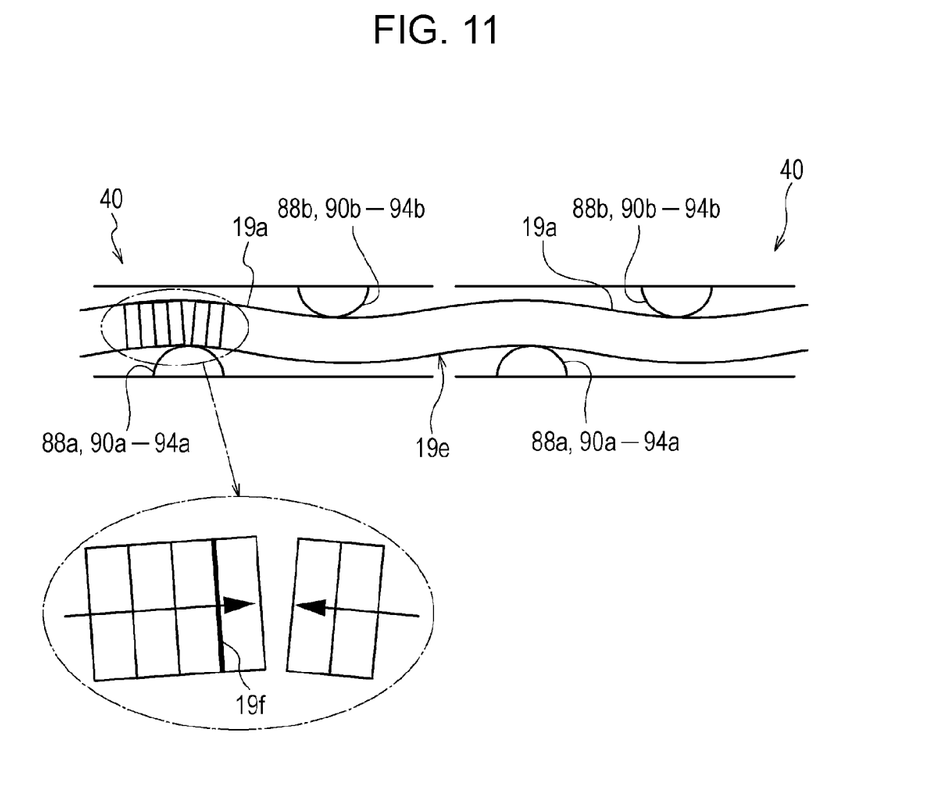
FIG. 11 is an explanatory drawing schematically illustrating an example in which a connection portion is drawn out at a position that interferes with a first convexity of an insulator in a stator of the related art.

Conversely, as illustrated in FIG. 11, since the coil ends 19a of the same phase that have been drawn out from a position that interferes with the first convexities 88a to 94a (or the second convexities 88b to 94b) receives holding force from the first convexities 88a to 94a (or the second convexities 88b to 94b) in different directions, the coil ends 19a that have been drawn out become disarrayed such that when connecting the connection portions 19e by fusing or the like, the orientation of the coil ends 19a need to be corrected or the coil ends 19a need to be held.

As described above, according to the exemplary embodiment described above, since the first convexities 88a to 94a and the second convexities 88b to 94b are formed in the opposing first wall surfaces 56c to 62c and second wall surfaces 56d to 62d of the lead wire end portion holding grooves 56a to 62a and 56b to 62b, and in holding the coil ends 19a that are housed in the lead wire end portion holding grooves 56a to 62a and 56b to 62b with the first convexities 88a to 94a and the second convexities 88b to 94b, the first convexities 88a to 94a and the second convexities 88b to 94b are formed at positions that are offset with respect to each other in the circumferential direction and the one end portions of the coil ends 19a of the same phase that are connection portions 19e are drawn out towards the outer diameter side from between the first convexities 88a to 94a and the second convexities 88b to 94b, the one end portions of the coil ends 19a that are to be drawn out are drawn out at a certain angle from the lead wire end portion holding grooves 56a to 62a and 56b to 62b while being held by the convexities 88a to 94a and 88b to 94b, when connecting the connection portions 19e by fusing or the like, correction of the orientation of the coil ends 19a is not needed or is facilitated and efficiency of the connection work can be improved.

Furthermore, since the width W5 between the first convexities 88a to 94a and the second convexities 88b to 94b are larger than the width W2 of the neutral point connection portion 19d, the other ends of the coil ends 19a of plural phases that are the neutral point connection portion 19d can be drawn out towards the outer diameter side from between the first convexities 88a to 94a and the second convexities 88b to 94b.

Furthermore, since not only the intervals between the first convexities 88a to 94a and the second convexities 88b to 94b of a single insulator 26 are set larger than the widths W1 and W2 of the connection portions 19d and 19e, the intervals between the first convexities 88a to 94a of one of the adjoining insulators 26 and the second convexities 88b to 94b of the other one of the adjoining insulators 26 are set larger than the widths W1 and W2 of the connection portions 19d and 19e, the coil ends 19a that are to be the connection portions 19d and 19e can be drawn out in a similar manner from between the adjoining insulators 26.

While the exemplary embodiment of the present disclosure has been described above, various design changes can be made to the present disclosure without departing from the scope of the present disclosure.

For example, in the exemplary embodiment described above, while the concavities 80a to 86a and 80b to 86b are formed in positions opposing the convexities 88a to 94a and 88b to 94b, the concavities 80a to 86a and 80b to 86b may be omitted.

Furthermore, in the exemplary embodiment described above, the neutral point connection portion 19d can be drawn out from between the first convexities 88a to 94a and the second convexities 88b to 94b since the width W2 of the neutral point connection portion 19d is smaller than the widths W5 between the first convexities 88a to 94a and the second convexities 88b to 94b; however, in a case in which the width W2 of the neutral point connection portion 19d is larger than the width W5 described above, the neutral point connection portion 19d may be divided and be drawn out from the first convexities 88a to 94a and the second convexities 88b to 94b and be connected through the neutral terminal N.

What is claimed is:
1. A stator of a rotary electric machine, comprising:
  a plurality of teeth that are disposed in a circumferential direction;
  coils of a plurality of phases that are wound around the teeth; and
  at least two or more coils of a same phase among the coils of the plurality of phases being connected in parallel with respect to each other, the coils including coil winding portions that are wound around the teeth, coil ends that are drawn out from the coil winding portions and that are drawn around in the circumferential direction, and connection portions that are each a connection of one end portions of the coils of the same phase among the coils of the plurality of phases, wherein an insulating member in which a groove portion that is open to at least an outer diameter side and that is formed with a first wall surface and a second wall surface that oppose each other are provided in each of the teeth, each of the coil ends is housed in a corresponding groove portion, a first convexity that protrudes towards a second wall surface side is formed on the first wall surface, a second convexity that protrudes towards a first wall surface side is formed on the second wall surface, the first convexity and the second convexity are formed at offset positions with respect to each other in the circumferential direction, and each of the connection portions is drawn out towards the outer diameter side from between the corresponding first convexity and second convexity.

2. The stator of a rotary electric machine according to claim 1, wherein each of the coils includes a neutral point connection portion in which other end portions of the coil ends of the coils of the plurality of phases are connected to each other, and an interval between the first convexity and the second convexity is larger than a width of the neutral point connection portion.

3. The stator of a rotary electric machine according to claim 1, wherein the first convexity and the second convexity in which the connection portion is drawn out towards the outer diameter side are the first convexity and the second convexity that are formed in a single piece of the insulating member.

4. The stator of a rotary electric machine according to claim 1, wherein the first convexity and the second convexity in which the connection portion is drawn out towards the outer diameter side are the first convexity of one of adjoining insulating members and the second convexity of the other one of the adjoining insulating members, respectively.

5. The stator of a rotary electric machine according to claim 1, comprising a first plurality of coil end holding groove portions house coil ends; and a second plurality of coil end holding groove portions house coil ends;

wherein the second plurality of coil end holding groove portions have widths in a radial direction that are smaller than widths in the radial direction of the first plurality of coil end holding groove portions.

6. The stator of a rotary electric machine according to claim 1, further comprising a first concavity formed on the second wall surface so as to face the groove portions, wherein facing the groove portions, the first convexity formed on the first wall surface so as to oppose the first concavity.

7. The stator of a rotary electric machine according to claim 6, further comprising a second concavity formed on the first wall surface so as to face the groove portions, wherein facing the groove portions, the second convexity formed on the second wall surface so as to oppose the second concavity.

8. The stator of a rotary electric machine according to claim 7, wherein a plurality of first concavities are formed on the second wall surface; a plurality of first convexities are formed on the first wall surface; a plurality of second concavities are formed on the first wall surface; and a plurality of second convexities are formed on the second wall surface.

9. The stator of a rotary electric machine according to claim 8, wherein the plurality of second concavities formed on the first wall surface and the plurality of first convexities formed on the first wall surface are provided alternatively in the circumferential direction, the plurality of first concavities formed on the second wall surface and the plurality of second convexities formed on the second wall surface are provided alternatively in the circumferential direction, such that wavy-shapes within the grove portions are formed.

10. The stator of a rotary electric machine according to claim 8, wherein the coil ends are deformed along the concavities and the convexities.

11. The stator of a rotary electric machine according to claim 9, wherein the coil ends are housed in a wavy manner within the grove portions.

12. The stator of a rotary electric machine according to claim 1, wherein the insulating member comprises a guide portion, having a width in the circumferential direction.

13. The stator of a rotary electric machine according to claim 12, wherein the first convexities and the second convexities are disposed in the guide portion width.

14. The stator of a rotary electric machine according to claim 1, wherein a plurality of first convexities are formed on the first wall surface and a plurality of second convexities are formed on the second wall surface;

each of the coils includes a neutral point connection portion in which other end portions of the coil ends of the coils of the plurality of phases are connected to each other, and widths between apexes of the plurality of first convexities and apexes of the plurality of second convexities are larger than a width of the neutral point connection portion.

15. A rotary electric machine, comprising:
a rotor; and
the stator according to claim 1.

16. The rotary electric machine according to claim 15, wherein the rotary electric machine is an electric motor.

17. The rotary electric machine according to claim 15, wherein the rotary electric machine is a dynamo.

* * * * *